United States Patent [19]
Boissier et al.

[11] 3,725,415
[45] Apr. 3, 1973

[54] 3-TROPANYLIDINE DERIVATIVES OF TRICYCLIC COMPOUNDS, THEIR SALTS, AND PROCESS OF PREPARATION

[75] Inventors: Jacques R. Boissier, Paris; Roger Ratouis, Saint-Cloud, both of France

[73] Assignee: Societe anonyme dite: Societe Industrielle pour La Fabrication des Antibiotiques (S.I.F.A), Puteaux, France

[22] Filed: Oct. 21, 1969

[21] Appl. No.: 868,230

[30] Foreign Application Priority Data

Oct. 22, 1968 France...........................P.V. 170 767
Dec. 20, 1968 France................................68179397

[52] U.S. Cl...................................260/292, 424/265
[51] Int. Cl. ..............................................C07d 43/06
[58] Field of Search........260/293.43, 293.44, 293 A, 260/292

[56] References Cited

UNITED STATES PATENTS

| | | | |
|---|---|---|---|
| 1,915,334 | 6/1933 | Salzberg et al. | 260/243 |
| 3,014,911 | 12/1961 | Engelhordt | 260/293.4 |
| 3,264,308 | 8/1966 | van der Stelt | 260/292 |

FOREIGN PATENTS OR APPLICATIONS

| | | | |
|---|---|---|---|
| 659,475 | 3/1963 | Canada | 260/292 |
| 105,025 | 8/1966 | Denmark | 260/293 A |

OTHER PUBLICATIONS

Chem Abstracts, vol 70: 96491 e, 1969, van der Stelt
J. Med & Pharm. Chem., vol. 5, 1962, pages 373–374, 377–379, Villani et al.

Primary Examiner—Henry R. Jiles
Assistant Examiner—S. D. Winters
Attorney—Davis, Hoxie, Faithfull & Hapgood

[57] ABSTRACT

Tropane derivatives and acid addition and quaternary ammonium salts thereof, said tropane derivatives having the formula:

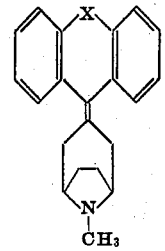

in which X represents: $-CH_2-CH_2-$, $-CH=CH-$,

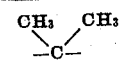

and $-CH_2-S-$.

These products are useful in human therapeutics namely as antihistaminic, spasmolytic and antiparkinson medicines.

Compounds of formula 1 are prepared by reacting the organo-magnesium compound of 3β-chlorotropane with a ketone of formula:

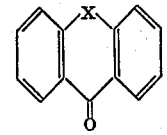

hydrolyzing with water and resulting magnesium complex and reacting the obtained compound with a dehydrating agent (acetic anhydrid or phosphorous oxychloride or hydrochloric acid).

2 Claims, No Drawings

3-TROPANYLIDINE DERIVATIVES OF TRICYCLIC COMPOUNDS, THEIR SALTS, AND PROCESS OF PREPARATION

The present invention relates to new tropane derivatives, their acid addition and quaternary ammonium salts and to the process for preparation thereof.

The compounds according to the invention have proved to be very useful in human therapeutics, namely as antihistaminic, spasmolytic and antiparkinson medicines.

The new tropane derivatives, according to the invention, are represented by the formula:

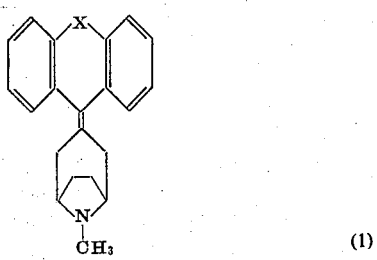

where X represents one of the following divalent radicals: $-CH_2-CH_2-$, $-CH=CH-$,

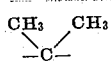

or $-CH_2-S-$.

According to the invention the process for the preparation of tropane derivatives of formula (1) comprises reacting the organo-magnesium compound of 3β-chlorotropance with a ketone of formula:

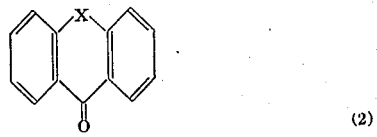

where X has the meaning defined above, hydrolyzing with water the resulting magnesium complex, reacting the thus obtained compound of formula:

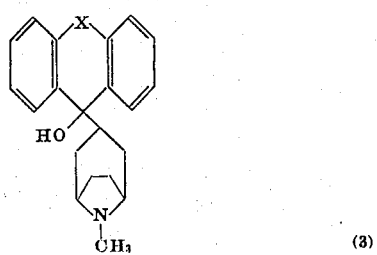

where X has the meaning defined above, with a dehydrating agent in order to obtain the compound of formula 1.

The process is preferably carried out as follows:

a. condensation of the organo-magnesium compound of 3β-chloro-tropane with the ketone of formula 2 is carried out in tetrahydrofuran at the boiling temperature of the reactive medium. After addition of water, the compound of formula 3 is extracted with solvents from the reactive mixture.

b. dehydration of the compound of formula 3 is carried out in acetic acid with acetic anhydrid used in excess. The reaction is advantageously carried out with the hydrochloride of the compound of formula (3) generated in situ with dry hydrogen chloride, the temperature of the reactive medium being maintained between 50° C and the medium boiling point. When the reaction is over, the reactive mixture is poured into water in order to decompose the excess of acetic anhydrid, then made alkaline with sodium hydroxide and the resulting compound of formula 1 is extracted with a solvent. Said compound may eventually be then purified by extraction from the organic phase with an aqueous acid, alkalization of the aqueous phase, extraction with a solvent and concentration of the extracts.

The dehydration of the compound of formula 3 can also be effected by phosphorus oxychloride used in large excess and then also used as reactive medium, this reaction being advantageously performed at the boiling temperature of the reactive mixture. At the end of the reaction, the mixture is carefully poured into water in order to decompose the excess of phosphorus oxychloride, the obtained aqueous solution is made alkaline with sodium hydroxide and the obtained compound of formula 1 is extracted with a solvent.

The dehydration of the compound of formula 3 can also be effected by hydrochloric acid ; in this case a solution of the compound of formula 3 is boiled under reflux in a mixture of acetic acid and concentrated hydrochloric acid. At the end of the reaction, the solution is diluted with water and made alkaline with sodium hydroxide; the compound of formula 1 is then extracted with a solvent.

Compounds of formula 1 above described show a basic character and according to the invention, their acid addition salts are prepared by reacting the corresponding mineral or organic acids with the compounds of formula 1, performing preferentially in a solvent. Preference is given to anhydrous solvents such as ethylether, ethanol and acetone.

According to the invention, quaternary ammonium salts of compounds of formula 1 are prepared by reacting with the compounds of formula 1 the corresponding quaternizing agents, preferably in the presence of a solvent. Preference is given to anhydrous solvents such as ethylether, acetonitrile, acetone, dioxane, methanol, ethanol.

New tropane derivatives of formula 1 and their salts are very useful substances in human therapeutic, namely by their remarkable antihistaminic, parasympatholytic and anticholinergic properties. Results obtained in pharmacological study of these derivatives have been summarized in the table below, where are shown:

a. the protective efficient doses 50 (ED 50) of compounds against a dose of 0.8 mg/kg of histamine dihydrochloride administered by intravenous route in guinea pig. The injection of histamine was administered 30 minutes after the subcutaneous injection of the tested compound (J.R. BOISSIER et al. chimie thérapeutique 1967, No. 5 p. 323–328).

The E.D. 50 of a compound is the dose protecting 50 percent of the tested animals against a single lethal dose of histamine.

b. the protective efficient doses 50 (E.D.50) of compounds against a dose of 20 mg/kg of tremorine administered in mice by intraperitoneal route. The injection of tremorine has been effected 30 minutes after the intraperitoneal injection of the tested compound.

These E.D. 50 represent the doses of compounds protecting 50 percent of tested animals against tremors (T) and parasympathomimetic reactions (PS) namely salivation, lacrimation, diarrhea, naturally induced by an injection of tremorine.

It appears that at a small dose the tested compounds are endowed with a very obvious peripheral and central anticholinergic activity.

c. the protective efficient doses 50 (ED 50) of compounds against sinistrotorsion induced in guinea pig by an intracarotid injection of 0.012 mg/kg of oxotremorine. In the present experiment, the injection of oxotremorine has been effected 30 minutes after the subcutaneous administration of the tested compound (H. DIAMANT : Acta otolaryngologica suppl. 111). Thus the important central anticholinergic activity of tested compounds was showed.

d. the lethal doses 50 (LD 50) evaluated in mice by intraperitoneal route. Death rate was noticed 48 hours after the injection and LD 50 doses were calculated according to BEHRENS-KARBER's method.

son's disease. The usual dose varies according to the used product, the treated patient, the concerned complaint and the selected administration route; it may be for instance from 5 mg to 100 mg per day, by oral route in human beings.

As medicines, new tropane derivatives of formula 1 may be employed either in the form of base or in the form of pharmaceutically acceptable acid addition salts or quaternary ammonium salts. Preference is given among the acid addition salts to those obtained with the following acids : hydrochloric, hydrobromic, hydroiodic, nitric, sulfuric, phosphoric, acetic, maleic, fumaric, succinic, tartaric, citric, benzoic, alkane sulfonics, and among quaternary ammonium salts, to those obtained with alkylhalides, such as for instance methyl chloride, bromide or iodide, hydroxyalkyl halides such as, for instance, 2-hydroxyethyl chloride, bromide or iodide, alkyl sulfates such as, for instance, dimethyl sulfate, alkyl-alkane sulfonates or alkyl-arene sulfonates, such as methyl-methane sulfonate, methyl-benzene sulfonate or methyl-toluene sulfonate.

The present invention concerns also pharmaceutical compositions which comprise as active principles one at least of the compounds of the formula 1 and/or their acid addition salts and/or quaternary ammonium salts. These compositions are prepared in order to be administered through digestive, parenteral or local route. They can be solid or liquid; the pharmaceutical compositions are those usually employed in human

TABLE

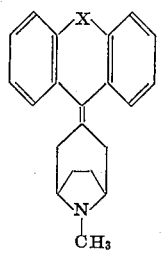

| X | Example N°. | Form | Histamine ED 50 in mg./kg. | Tremorine ED 50 in mg./kg. | | Sinistrotorsion ED 50 in mg./kg. | LD 50 in mg./kg. |
|---|---|---|---|---|---|---|---|
| | | | | T | PS | | |
| CH=CH | 8 | HCl | 0.05–0.1 | 2 | 2 | 0.5–1 | 57 |
| CH=CH | 10 | SO₄(CH₃)₂ | 0.05 | 10 | 1 | >10 | 25 |
| CH₂—CH₂ | 1 | Base* | 5 | 1 | 1 | | 86 |
| CH₂—CH₂ | 3 | CH₃SO₃H | 2 | 1 | 1 | 0.5 | 93 |
| CH₂—CH₂ | 5 | SO₄(CH₃)₂ | 0.2–0.5 | 10 | <0.5 | 5–10 | 31 |
| C=(CH₃)₂ | 11 | Base* | 0.2–0.5 | 2 | 2 | 0.5–1 | 74 |
| C=(CH₃)₂ | 12 | SO₄(CH₃)₂ | 2 | 5 | <0.5 | 5–10 | 28 |
| CH₂—S | 13 | Base* | 5 | 1–2 | 1–2 | 0.2–0.5 | 82 |
| CH₂—S | 14 | HCl | 5 | 1–2 | 1–2 | 1–2 | 95 |

* this compound has been prior dissolved in diluted acetic acid.

Owing to their very interesting pharmacological activities and especially owing to their antihistaminic, parasympatholytic and anticholinergic properties, new tropane derivatives of formula 1, their acid addition salts and quaternary ammonium salts are very useful medicines, especially as antihistaminic, spasmolytic and antiparkinson drugs. They can thereby be employed in treatment of cutaneous allergic diseases (as for instance : urticaria, contact dermatitis, eczemas, erythemas) allergic rhinitis, allergic asthma, gastritis, spasmodic gastrointestinal disturbances and Parkinson's disease.

medicine, as for instance tablets, coated or not, capsules, solutions, syrups, suppositories, parenteral preparations, ointments, creams, gels and aerosols; they are prepared according to usual means. The active principle or principles can be incorporated with excipients which are normally employed in those pharmaceutical compositions, such as for instance, talcum, arabic gum, lactose, starch, magnesium stearate, cocoa butter, aqueous or non aqueous vehicles, animal or vegetable fatty substances, paraffins, glycols, various wetting dispersing and emulsifying agents and preservatives.

The following non limiting examples illustrate the invention:

EXAMPLE 1

3-(10,11-dihydro-5H-dibenzo [a,d]-cyclohepten-5-ylidene) tropane.

The organo-magnesium compound of 3β-chlorotropane was prepared from 5.32 g (0.222 at.g) of magnesium turnings and 35.4g (0.222 mole) of 3 β-chlorotropane in 200 ml of anhydrous tetrahydrofuran under dry nitrogen. A solution of 32 g (0.154 mole) of 10,11-dihydro-5H-dibenzo [a,d]-cyclohepten-5-ene in 50 ml of anhydrous tetrahydrofuran was then added. The mixture was boiled for 1 hour under reflux with stirring, left at room temperature overnight, poured into a mixture of 500 g of ice and 100 ml of water containing 20 g of ammonium chloride and extracted with ether. The etheral solution was evaporated to give an oil which slowly crystallized and which was stirred with 50 ml of pentane. Pentane was removed by filtration and the resulting solid collected to give 40 g (75 percent) of 3-(10,11-dihydro-5-hydroxy-5H-dibenzo [a,d]-cyclohepten-5-yl) tropane as cream-colored crystals. Melting point on a hot stage microscope after recrystallization from acetonitrile : 183°–185° C.

Analysis : $C_{23}H_{27}N\,O$

|  | C | H |
|---|---|---|
| Calculated % | 82.8 | 8.2 |
| Found % | 82.6 | 8.3 |

40 g (0.12 mole) of 3-(10,11-dihydro-5-hydroxy-5H-dibenzo [a,d]-cyclohepten-5-yl) tropane were dissolved in 210 ml of acetic acid. Dry hydrogen chloride was bubbled through this solution for 30 minutes. Then, 60 g of acetic anhydrid were added and the solution was heated on water bath for 1 hour 30.

The resulting solution was poured into 1 liter of water and washed with ether. Aqueous phase was separated from ethereal phase by decantation, and basified by addition of sodium hydroxide and extracted with chloroform.

Chloroformic solution was concentrated to give an oil which was dissolved in 200 ml of ether, and added by ethanolic hydrochloric acid solution until acidity of the medium. The resulting precipitate was collected and suspended in 500 ml of water. The suspension was made alkaline by addition of sodium bicarbonate and extracted with ether. The ethereal solution was concentrated to give an oil which crystallized and which was stirred with 50 ml of pentane. Pentane was removed by filtration and 15 g (39 percent) of 3-(10,11-dihydro-5 H-dibenzo [a,d]-cyclohepten-5-ylidene) tropane was collected as a cream-colored solid. Melting point on a hot stage microscope : 132°–133° C.

Analysis : $C_{23}H_{25}N$

|  | C | H |
|---|---|---|
| Calculated % | 87.6 | 8.0 |
| Found % | 87.4 | 8.1 |

EXAMPLE 2

3-(10,11-dihydro-5H-dibenzo [a,d]-cyclohepten-5-ylidene) tropane hydrochloride.

One g of 3-(10,11-dihydro-5H-dibenzo [a,d]-cyclohepten-5-ylidene) tropane was dissolved in 30 ml of anhydrous ether and stoichiometric amounts of an ethanolic hydrochloric acid solution were added. The resulting precipitate was collected to give 3-(10,11-dihydro-5H-dibenzo [a,d]-cyclohepten-5-ylidene) tropane hydrochloride as white crystals. Melting point on a hot stage microscope, after recrystallization from acetonitrile : 300° C with decomposition.

Analysis : $C_{23}H_{26}Cl\,N$

|  | C | H |
|---|---|---|
| Calculated % | 78.5 | 7.5 |
| Found % | 78.7 | 7.5 |

EXAMPLE 3

3-(10,11-dihydro-5H-dibenzo [a,d]-cyclohepten-5-ylidene) tropane methanesulfonate.

Six g (0.19 mole) of 3-(10,11-dihydro-5H-dibenzo [a,d]-cyclohepten-5-ylidene) tropane were dissolved in 100 ml of anhydrous ether and stoichiometric amounts of methane sulfonic acid were added. The resulting precipitate was collected to give 5.3 g (64 percent) of 3-(10,11-dihydro-5H-dibenzo [a,d]-cyclohepten-5-ylidene) tropane methanesulfonate as water-soluble white crystals. Melting point on a hot stage microscope after recrystallization from a mixture acetone-ether : 221°–222° C.

Analysis : $C_{24}H_{29}N\,O_3S$

|  | C | H |
|---|---|---|
| Calculated % | 70.0 | 7.1 |
| Found % | 70.1 | 7.3 |

Besides pharmacological results mentioned above and relating to this compound it was observed that said compound injected in mice at a dose of 5 mg/kg by intraperitoneal route, induced a distinct decrease of reserpine ptosis; it was also observed that said compound induced, from the oral dose of 10 mg/kg, a high potentiation of stereotyped movements observed in rats by an injection of d-amphetamine (Halliwell et al. Brit. J. Pharmacol. 1964, 23, 330). These results show the interesting antidepressant activity of this compound.

EXAMPLE 4

3-(10,11-dihydro-5H-dibenzo [a,d]-cyclohepten-5-ylidene) tropane methiodide.

One g of 3-(10,11-dihydro-5H-dibenzo [a,d]-cyclohepten-5-ylidene) tropane was dissolved in 30 ml of anhydrous ether and added with a solution of 2 ml of methyliodide in 30 ml of anhydrous ether. The mixture was left for 48 hours at 0° C. the resulting precipitate was collected to give 3-(10,11-dihydro-5H-dibenzo [a,d]-cyclohepten-5-ylidene) tropane methiodide as white crystals. Melting point on a hot stage microscope after recrystallization from acetonitrile : 332°–333° C.

Analysis : $C_{24}H_{28}I\,N$

|  | C | H |
|---|---|---|
| Calculated % | 63.0 | 6.2 |
| Found % | 63.1 | 6.1 |

EXAMPLE 5

3-(10,11-dihydro-5H-dibenzo [a,d]-cyclohepten-5-ylidene) tropane dimethylsulfate.

One g of 3-(10,11-dihydro-5H-dibenzo [a,d]-cyclohepten-5-ylidene) tropane was dissolved in 50 ml of acetone and added with 2 ml of dimethyl sulfate. The mixture was left for 48 hours at 0° C. The resulting precipitate was collected to give 3-(10,11-dihydro-5H-dibenzo [a,d]-cyclohepten-5-ylidene) tropane dimethylsulfate as water-soluble white crystals. Melting point on a hot stage microscope after recrystallization from isopropanol : 240°–243° C.

Analysis : $C_{25}H_{31}N O_4 S$

|  | C | H |
|---|---|---|
| Calculated % | 68.0 | 7.1 |
| Found % | 68.1 | 7.2 |

EXAMPLE 6

3-(5H-dibenzo [a,d]-cyclohepten-5-ylidene) tropane.

The organo-magnesium compound of 3β-chlorotropane was prepared from 5.5 g (0.23 at-g) of magnesium turnings and 36.5 g (0.23 mole) of 3β-chlorotropane in 200 ml of anhydrous tetrahydrofuran under dry nitrogen. The solution of 35.4 g (0.172 mole) of 5H-dibenzo [a,d] cyclohepten-5-one in 200 ml of anhydrous tetrahydrofuran was then added, the mixture was refluxed for 1 hour with stirring and left at room temperature overnight. The reactive mixture was poured into a mixture of 500 g of ice and 100 ml of water containing 20 mg of ammonium chloride and extracted with chloroform. Concentration of the chloroformic solution give 46 g (60 percent) of 3-(5-hydroxy-5H-dibenzo [a,d]-cyclohepten-5-yl) tropane as cream-colored crystals. Melting point on a hot stage microscope after recrystallization from acetonitrile : 186°–188° C.

Analysis : $C_{23}H_{25}N O$

|  | C | H |
|---|---|---|
| Calculated % | 83.3 | 7.6 |
| Found % | 82.9 | 7.7 |

Twenty-three g (0.0695 mole) of 3-(5-hydroxy-5H-dibenzo [a,d]-cyclohepten-5-yl) tropane were dissolved in 200 ml of phosphorus oxychloride and the mixture was boiled under reflux for 1 hour. The resulting solution was poured into 1 liter of water, made alkaline by addition of sodium hydroxide and extracted with chloroform. Concentration of chloroformic solution gave 15 g (69 percent) of 3-(5H-dibenzo [a,d]-cyclohepten-5-ylidene) tropane as a crystalline solid. Melting point on a hot stage microscope after recrystallization from acetonitrile : 183° C.

Analysis : $C_{23}H_{23}N$

|  | C | H | N |
|---|---|---|---|
| Calculated % | 88.1 | 7.4 | 4.5 |
| Found % | 88.1 | 7.4 | 4.4 |

EXAMPLE 7

3-(5H-dibenzo [a,d]-cyclohepten-5-ylidene) tropane.

Following the procedure described in example 1, but starting from 41 g (0.124 mole) of 3-(5-hydroxy-5H-dibenzo [a,d] cyclohepten-5-yl) tropane, 3-(5H-dibenzo [a,d]-cyclohepten-5-yl) tropane was obtained as a crystalline solid identical with that described in example 6. Melting point on a hot stage microscope after recrystallization from acetonitrile : 183°C.

EXAMPLE 8

3-(5H-dibenzo [a,d]-cyclohepten-5-ylidene) tropane hydrochloride.

One g of 3-(5H-dibenzo [a,d,]-cyclohepten-5-ylidene) tropane was dissolved in 100 ml of anhydrous ether and stoichiometric amounts of an ethanolic hydrochloric acid solution were added. The resulting precipitate was collected to give 3-(5H-dibenzo [a,d]-cyclohepten-5-ylidene) tropane hydrochloride as water-soluble white crystals. Melting point on a hot stage microscope after recrystallization from isopropanol : 301°–303° C.

Analysis : $C_{23}H_{24}Cl N$

|  | C | H | N |
|---|---|---|---|
| Calculated % | 79.0 | 6.9 | 4.0 |
| Found % | 78.7 | 7.0 | 4.0 |

EXAMPLE 9

3-(5H-dibenzo [a,d]-cyclohepten-5-ylidene) tropane methiodide.

One g of 3-(5H-dibenzo [a,d]-cyclohepten-5-ylidene) tropane was dissolved in 100 ml of anhydrous ether and added with 2 ml of methyl iodide. The mixture was left for 3 hours at 0° C. The resulting precipitate was collected to give 3-(5H-dibenzo [a,d]-cyclohepten-5-ylidene) tropane methiodide as cream-colored crystals. Melting point on a hot stage microscope after recrystallization from acetonitrile : 198°–201° C.

Analysis : $C_{24}H_{26}I N$

|  | C | H | N |
|---|---|---|---|
| Calculated % | 63.3 | 5.7 | 3.1 |
| Found % | 63.5 | 5.8 | 3.1 |

EXAMPLE 10

3-(5H-dibenzo [a,d]-cyclohepten-5-ylidene) tropane dimethylsulfate.

1.5 g of 3-(5H-dibenzo [a,d]-cyclohepten-5-ylidene) tro-pane was dissolved in 80 ml of acetone and added with 5 ml of dimethyl sulfate. The mixture was left for 4 hours at 0° C and added with 100 ml of anhydrous ether. The resulting precipitate was collected, recrystallized from isopropanol to give 1.1 g of 3-(5H-dibenzo [a,d]-cyclohepten-5-ylidene) tropane dimethylsulfate as water-soluble white crystals. Melting point on a hot stage microscope : 240°–245° C.

Analysis : $C_{25}H_{29}N O_4S$

|  | C | H | N |
|---|---|---|---|
| Calculated % | 68.3 | 6.7 | 3.2 |
| Found % | 68.2 | 6.5 | 3.0 |

EXAMPLE 11

3-(10,10-dimethyl-9,10-dihydroanthracen-9-ylidene) tropane.

The organo-magnesium compound of 3β-chlorotropane was prepared from 5.6 g (0.234 at-g) of magnesium turnings and 37.3 g (0.234 mole) of 3β-chlorotropane in 170 ml of anhydrous tetrahydrofuran under dry nitrogen. The solution of 40 g (0.18 mole) of 10,10-dimethyl-9-anthrone in 200 ml of anhydrous tetrahydrofuran was then added. The mixture was boiled under reflux while stirring for 1 hour, left at room temperature overnight, then poured into a mixture of 500 g of ice and 150 ml of water containing 20 g of ammonium chloride and extracted with chloroform. The chloroformic solution was concentrated to give a solid residue which was recrystallized from xylene, 11.5 g (19 percent) of 3-(9-hydroxy-10,10-dimethyl-9,10-dihydroanthracen-9-yl) tropane, as cream-colored crystals, were obtained. Melting point on a hot stage microscope : 265°–267° C.

Analysis : $C_{24}H_{29}NO$

|  | C | H |
|---|---|---|
| Calculated % | 82.9 | 8.4 |
| Found % | 82.8 | 8.3 |

Eight g (0.023 mole) of 3-(9-hydroxy-10,10-dimethyl-9,10-dihydroanthracen-9-yl) tropane were dissolved in 70 ml of phosphorus oxychloride and boiled under reflux for 1 hour. The resulting solution was poured into 400 ml of water, made alkaline by adding sodium hydroxide then extracted with chloroform. Chloroformic solution was concentrated to give a solid. Recrystallization from heptane gave 4 g (53 percent) of 3-(10,10-dimethyl-9,10-dihydroanthracen-9-ylidene) tropane as white crystals. Melting point on a hot stage microscope 200°–203° C.

Analysis : $C_{24}H_{27}N$

|  | C | H | N |
|---|---|---|---|
| Calculated % | 87.5 | 8.3 | 4.3 |
| Found % | 87.7 | 8.2 | 4.2 |

EXAMPLE 12

3-(10,10-dimethyl-9,10-dihydroanthracen-9-ylidene) tropane dimethylsulfate.

Two g of 3-(10,10-dimethyl-9,10-dihydroanthracen-9-ylidene) tropane were dissolved in 100 ml of ether and added with 5 ml of dimethyl sulfate. After 5 minutes, the resulting precipitate was collected to give 3-(10,10-dimethyl-9,10-dihydroanthracen-9-ylidene) tropane dimethylsulfate as white crystals. Melting point after recrystallization from isopropanol :>350° C.

Analysis : $C_{26}H_{33}NO_4S$

|  | C | H | N |
|---|---|---|---|
| Calculated % | 68.5 | 7.3 | 3.1 |
| Found % | 68.4 | 7.2 | 3.1 |

EXAMPLE 13

3-dibenzo [b,e]-thiepin-11 (6H)-ylidene tropane.

The organo-magnesium compound of 3β-chlorotropane was prepared from 5.9 g (0.244 at-g) of magnesium turnings and 38.8 g (0.244 mole) of 3β-chlorotropane in 200 ml of anhydrous tetrahydrofuran under dry nitrogen. The mixture was then added with the solution of 42 g (0.185 mole) of dibenzo [b,e]-thiepin-11(6H)-one in 100 ml of anhydrous tetrahydrofuran, boiled under reflux for 1 hour while stirring and left at room temperature overnight. The reactive mixture was poured into the mixture of 500 g of ice and 100 ml of water containing 20 g of ammonium chloride and extracted with chloroform. Chloroformic solution was concentrated to give a residue which was recrystallized from acetonitrile, 11.5 g (18 percent) of 3-(6,11-dihydro-11-hydroxy dibenzo [b,e]-thie-pin-11(6H)-yl) tropane were obtained as cream-colored crystals. Melting point on a hot stage microscope : 173°–175° C.

Analysis : $C_{22}H_{25}NOS$

|  | C | H | N |
|---|---|---|---|
| Calculated % | 75.2 | 7.2 | 4.0 |
| Found % | 75.0 | 7.1 | 4.0 |

Nine g (0.0256 mole) of 3-(6,11-dihydro-11-hydroxy dibenzo [b,e]-thiepin-11(6H)-yl) tropane were dissolved in the mixture of 100 ml of acetic acid and 40 ml of concentrated hydrochloric acid and boiled under reflux for 1 hour.

The resulting solution was poured into 500 ml of water and extracted with ether. Aqueous phase was separated by decantation from ethereal phase, basified by addition of sodium hydroxide, and extracted with ether.

Ethereal solution was concentrated to give 8 g of an oil which crystallized quickly and was recrystallized from acetonitrile. 3.5 g (41 percent) of 3-dibenzo [b,e]-thiepin-11(6H)-ylidene tropane were obtained as a creamy solid. Melting point on a hot stage microscope : 156°–158° C.

Analysis : $C_{22}H_{23}NS$

|  | C | H | N |
|---|---|---|---|
| Calculated % | 79.3 | 7.0 | 4.2 |
| Found % | 79.5 | 6.9 | 4.2 |

EXAMPLE 14

3-dibenzo [b,e]-thiepin-11(6H)-ylidene tropane hydrochloride.

Forty-five ml of 3.4 N ethanolic hydrochloric acid were added to a stirred suspension of 51.4 g (0.154 mole) of 3-dibenzo [b,e]-thiepin-11(6H)-ylidene tropane in 200 ml of isopropanol. While stirring, the resulting solution was added with 500 ml of ether and left to crystallize at 0° C. Resulting crystals were collected, washed with ether and dried to give 49 g (86 percent) of 3-dibenzo [b,e]-thiepin-11(6H)-ylidene tropane hydrochloride as white crystals. Melting point on a hot stage microscope : 272°–274° C.

Analysis : $C_{22}H_{24}ClNS$

|  | C | H | Cl | S |
|---|---|---|---|---|
| Calculated % | 71.4 | 6.5 | 9.6 | 8.7 |
| Found % | 71.0 | 6.5 | 9.2 | 8.5 |

EXAMPLE 15

3-dibenzo [b,e]-thiepin-11(6H)-ylidene tropane ethobromide.

One g of 3-dibenzo [b,e]-thiepin-11(6H)-ylidene tropane was dissolved in 50 ml of acetonitrile and added with 5 ml of ethylbromide. The solution was boiled under reflux for 2 hours. Acetonitrile was removed under vacuo. Resulting crystals were recovered in 50 ml of ether, collected and recrystallized from isopropanol, 3-dibenzo [b,e]-thiepin-11 (6H)-ylidene tropane ethobromide was obtained as white crystals. Melting point on a hot stage microscope : 289°–292° C.

Analysis : $C_{24}H_{28}BrNS$

|  | C | H | N |
|---|---|---|---|
| Calculated % | 65.1 | 6.4 | 7.3 |
| Found % | 64.9 | 6.3 | 7.3 |

EXAMPLE 16

3-dibenzo [b,e]-thiepin-11(6H)-ylidene tropane methyl methanesulfonate

One g of 3-dibenzo [b,e-thiepin-11(6H)-ylidene tropane was dissolved in 100 ml of ether and added with 5 ml of methylmethanesulfonate. The mixture was left for 48 hours at 0°C, resulting crystals were collected and recrystallized from isopropanol to give 3-dibenzo [b,e]-thiepin-11(6H)-ylidene tropane methyl methanesulfonate as white crystals. Melting point on a hot stage microscope : 243°–245° C.

Analysis : $C_{24}H_{29}NO_3S_2$

|  | C | H | N |
|---|---|---|---|
| Calculated % | 65.0 | 6.6 | 3.2 |
| Found % | 65.0 | 6.7 | 3.1 |

EXAMPLE 17

Tablets were prepared which corresponded to the formula :

- 3-(5H-dibenzo [a,d]-cyclohepten-5-ylidene) tropane hydrochloride 10 mg
- Excipient s.q. to make 200 mg
(excipient : lactose, starch, talcum, magnesium stearate)

EXAMPLE 18

An ointment was prepared which corresponded to the formula :

- 3-(5H-dibenzo [a,d]-cyclohepten-5-ylidene) tropane hydrochloride 2 g
Excipient s.q. to make 100 g

EXAMPLE 19

Tablets were prepared which corresponded to the formula :

- 3-(10,11-dihydro-5H-dibenzo [a,d]-cyclohepten-5-ylidene) tropane dimethylsulfate 25 mg
Excipient s.q. to make 200 mg
(excipient : lactose, starch, talcum, magnesium stearate)

EXAMPLE 20

Suppositories were prepared which corresponded to the formula :

- 3-(10,11-dihydro-5H-dibenzo [a,d]-cyclohepten-5-ylidene) tropane dimethylsulfate 25 mg
Excipient s.q. to make 3 g

EXAMPLE 21

Parenteral preparations were prepared which corresponded to the formula:

- 3-(10,11-dihydro-5H-dibenzo [a,d]-cyclohepten-5-ylidene) tropane dimethylsulfate 20 mg
- Excipient s.q. to make 2 ml

EXAMPLE 22

Drops were prepared which corresponded to the formula :

- 3-(10,11-dihydro-5H-dibenzo [a,d]-cyclohepten-5-ylidene) tropane dimethylsulfate 1 g
- Excipient s.q. to make 100 ml

EXAMPLE 23

Tablets were prepared which corresponded to the formula :

- 3-(10,10-dimethyl-9,10-dihydroanthracen-9-ylidene) tropane dimethylsulfate 25 mg
- Excipient s.q. to make 200 mg
(excipient : lactose, starch, talcum, magnesium stearate)

EXAMPLE 24

Tablets were prepared which corresponded to the formula :

- 3-(10,11-dihydro-5H-dibenzo [a,d]-cyclohepten-5-ylidene) tropane methanesulfonate 5 mg
- Excipient s.q. to make 200 mg
(excipient : lactose, starch, talcum, magnesium stearate)

EXAMPLE 25

Tablets were prepared which corresponded to the formula :

- 3-dibenzo [b,e]-thiepin-11(6H)-ylidene tropane 5 mg
- Excipient s.q. to make 200 mg
(excipient : lactose, starch, talcum, magnesium stearate)

We claim:

1. A compound selected from the group consisting of tropane derivatives, their acid addition salts and their quaternary ammonium salts, said tropane derivatives having the formula:

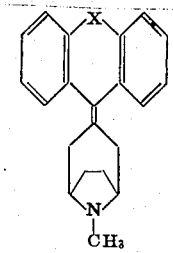

where X is CH₃ CH₃
         \ /
          C
          |
2. A compound selected from the group consisting of tropane derivatives, their acid addition salts and their quaternary ammonium salts, said tropane derivatives having the formula:
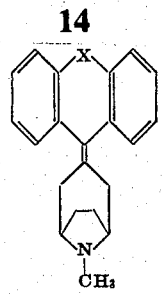
where X is —CH₂—S—.
* * * * *